UNITED STATES PATENT OFFICE.

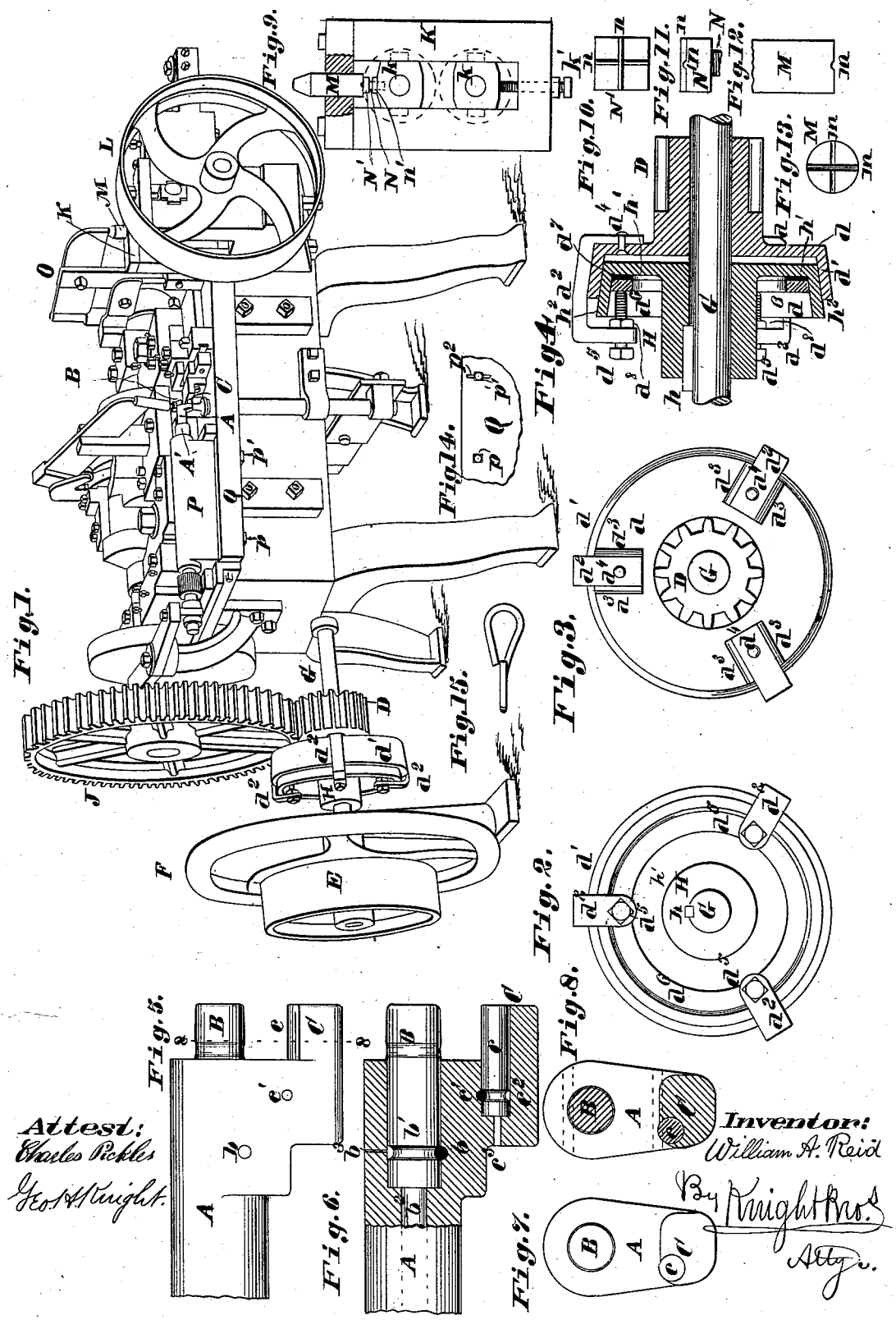

WILLIAM A. REID, OF ST. LOUIS, MISSOURI.

CHAIN-MACHINE.

SPECIFICATION forming part of Letters Patent No. 255,402, dated March 21, 1882.

Application filed November 1, 1881. (No model.)

*To all whom it may concern:*

Be it known that I, WILLIAM A. REID, of the city of St. Louis, in the State of Missouri, have invented a certain new and useful Improvement in Chain-Machines, of which the following is a full, clear, and exact description, reference being had to the accompanying drawings, forming part of this specification.

As my invention is confined to parts of an otherwise old machine—for instance, see Letters Patent No. 198,690, L. M. Rumsey, 25th December, 1877—my specifications will be confined to those parts, the drawings, however, showing a complete working machine having my improvements.

Figure 1 is a perspective view of a chain-machine with my improvements applied. Fig. 2 is a face view of the clutch-driving device. Fig. 3 is rear view of same, and Fig. 4 is a horizontal section of same. Fig. 5 is a side view of the bifurcated forming-finger having my improvements. Fig. 6 is a similar view, part in section. Fig. 7 is an end view of same; and Fig. 8 is a section of same, taken on line 8 8, Fig. 5. Fig. 9 is an end elevation of the device for adjusting the wire-feeding rollers; and Figs. 10, 11, 12, and 13 are enlarged detail views of same. Fig. 14 is a bottom view of part of the frame of the machine, showing the way in which one end of the finger-arm bracket is adjusted to compensate for stretch in wire. Fig. 15 is a view of an ill-formed chain-link, which deformity my adjustable bracket overcomes.

A is the forming-finger, secured to the finger-arm A' in any ordinary manner. The end of the finger has two projecting members, B and C, for forming the said eye of the chain-link by the movement imparted to the finger, as fully set forth in the said patent to Rumsey.

In my invention the member B consists of a cylindrical pin or roller secured in a bore of the body of the finger by a transverse pin, $b$, passing through the finger and through a circumferential groove, $b'$, in the roller. (See Fig. 6.) The projecting part of the member B may be slightly grooved, as shown, to receive the wire from which the link is made. This groove, however, must be very shallow, for by an endwise movement the finger withdraws from the link as it forms it, and were the groove deep the finger would take too great a hold of the wire. The body of the finger has an opening, $b^2$, so that when the transverse pin is removed the member B can be knocked out from the rear. $b^3$ is an oil-hole through the finger, just above pin $b$. The other projecting member, C, of the finger is formed of a portion of the finger which is bored to receive a small friction-roller, $c$, held in place by a transverse pin, $c'$, passing through the finger and through a circumferential groove, $c^2$, in the roller. The roller $c$ is not wholly inclosed within the member C, (see Figs. 5, 7, and 8,) and its exposed part forms the bearing-surface of the wire as the link is formed. It will thus be seen that both of the bearings, as the link is formed, turn freely upon the wire, which both avoids friction and the quick wearing out of the forming members.

$c^3$ is a hole in the body of the finger, at the rear of the friction-roller $c$, for the introduction of an instrument to knock out the roller when the transverse pin $c$ is removed for the purpose of adding a new one, or for any other reason.

I will now proceed to describe the clutch-driving device, which is located between the cog-pinion D and the driving-pulley and fly-wheel E F on the counter-shaft G of the machine. The parts can best be seen in the sectional view, Fig. 4.

H is a tight collar, secured to the shaft G in any ordinary manner. I have shown a key, $h$. This collar H has a circumferential flange, $h'$, terminating in an oblique peripheral flange, $h^2$.

The driving-pinion D is loose upon the shaft G, and has a circumferential flange, $d$, terminating in an oblique flange, $d'$, surrounding the flange $h^2$ of the collar H. $d^2$ are dogs, secured to the flange of the pinion D by lugs $d^3$ and bolts or rivets $d^4$. (See Fig. 3.)

Through the inwardly-projecting ends of the dogs $d^2$ screw jam-bolts $d^5$, whose inner ends bear against a metallic ring, $d^6$, which preferably has a leather face, $d^7$, bearing against the flange $h'$ of the collar H. It will thus be seen that as the jam-bolts are tightened up the oblique flanges will be forced against each other sufficiently tight to drive the machine; but should the machine become clogged by the kinking of the wire the flanges will slip upon each other and the ring $d^6$ slip upon the flange of the collar H, and the machine will stop though the power is not removed. As soon as the kink is taken out of the chain, or the clog removed from the machinery, the machine will again begin to operate. The oblique flanges are not absolutely necessary, as the flanges $h'$ $d$ may come in direct contact with each other.

$d^3$ are jam-nuts on the bolts $d^5$.

The pinion D engages with the cog-wheel J on the main shaft of the machine.

I will now proceed to describe the wire-feeding device.

The wire is fed through between two grooved rollers similar to those shown by the patent mentioned, and shown in end view by dotted lines in Fig. 9 of the accompanying drawings. The shafts of these rollers have bearing in boxes $k$ at one end capable of vertical movement in the frame K. The lower roller may be adjusted up or down by an adjusting-bolt, $k'$, which screws through the bottom of the frame and forms the vertical support of the boxes. When in its natural position the upper feed-roller rests upon the lower one; but when the wire is inserted between their surfaces they are slightly separated by it. The weight of the upper roller is not sufficient to feed the wire forward, as the rollers are revolved by power applied to a pulley, L, on one of their shafts. There is a cog-gearing connection between the shafts of the two rollers.

M is a plug fitting loosely in the top of the frame K, and resting upon the head N' of a bolt, N, screwed into the top of the upper box of the feed-rollers. Against the upper end of the plug M strikes the lever O to force the feed-rollers together, or rather tighten them upon the wire, and cause the wire to be fed forward as long as the lever is in contact with the plug; but as soon as the lever is removed from the plug the feed will stop. The lever is worked automatically by an eccentric cam, and its operating parts will not be described, as they are old and well known. The face of the lower end of the plug M has transverse grooves $m$, one being deeper than the other. (See Figs. 12 and 13.)

On the face of the bolt-head N' are transverse ribs $n$, one of which is higher than the other. (See Figs. 10 and 11.) The ribs $n$ rest in the grooves $m$ when the plug is in place; and the object of having one groove deeper than the other and one rib higher than the other is to allow the height of the plug to be changed by turning it to bring the deep groove in contact with the low rib, and vice versa, to correspond with the different diameter of wires from which the chain is being made. Thus the height of the plug always being the same the pressure of the lever upon the plug will likewise always be the same.

$n'$ is a jam-nut on the bolt N, which is screwed up or down to rest upon the top of the box as the bolt is turned to adjust the height of the plug M.

I will now describe my invention relating to the adjustable bracket.

P is the bracket, in which the finger-arm has journal-bearing. It rests upon and is secured to the table or frame Q of the machine by bolts $p$ $p'$, passing up through the machine-frame and screwing into the bracket from beneath. The bolt $p'$ passes through a slot, $p^2$, in the frame. (See Fig. 14.) By loosening this bolt the end of the bracket may be swung to or from the machine, the other bolt acting as a pivot to compensate for stretch in wire of different degrees of hardness and quality. When the bracket is adjusted the bolt $p'$ is tightened to hold it to its adjustment.

In Fig. 15 is shown a link formed by a stationary bracket where the wire was softer than usual and stretched as the last eye of the link was formed. Instead of the two ends abutting against each other, as they should, the end of the last-formed eye overlaps the other end, making a defective link.

With my adjustable bracket, chain from metal of all degrees of temperature may be made on the same machine.

Having thus described my invention, the following is what I claim as new therein and desire to secure by Letters Patent:

1. In a chain-machine, the bifurcated finger one fork of which consists of a cylindrical pin, B, secured in a bore of the finger by means of groove $b'$ and pin $b$, and the other fork of which consists of a projection, C, nearly inclosing the roller $c$, which is held in place by means of groove $c^2$ and pin $c'$, so as to turn freely, all substantially as set forth.

2. In a chain-machine, the clutch-driving device consisting of a tight collar, H, with flange $h'$, loose pinion D, with flange $d$, dogs $d^2$, jam-bolts $d^5$, and ring $d^6$, all made substantially as and for the purpose set forth.

3. The combination, in a chain-machine, of the shaft G, loose pinion D, with flanges $d$ $d'$, dogs $d^2$, jam-bolts $d^5$, ring $d^6$, and tight collar H, with flanges $h'$ $h^2$, all substantially as and for the purpose set forth.

4. In a chain-machine, the combination of frame K, adjustable boxes $k$, adjusting-screw $k'$, adjustable bolt N, with head N', having ribs $n$ of different heights, and loose plug M, having grooves $m$ of different depths, as and for the purpose set forth.

5. In a chain-machine, the combination of bracket P and support Q, the bracket being hinged to its support at one end and adjustable at its other end, and having suitable means for locking it to its adjustment, as set forth.

WILLIAM A. REID.

Witnesses:
  SAML. KNIGHT,
  GEO. H. KNIGHT.